(No Model.) 3 Sheets—Sheet 2.
H. W. GLEASON.
TOWER.
No. 540,096. Patented May 28, 1895.
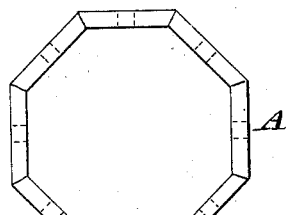
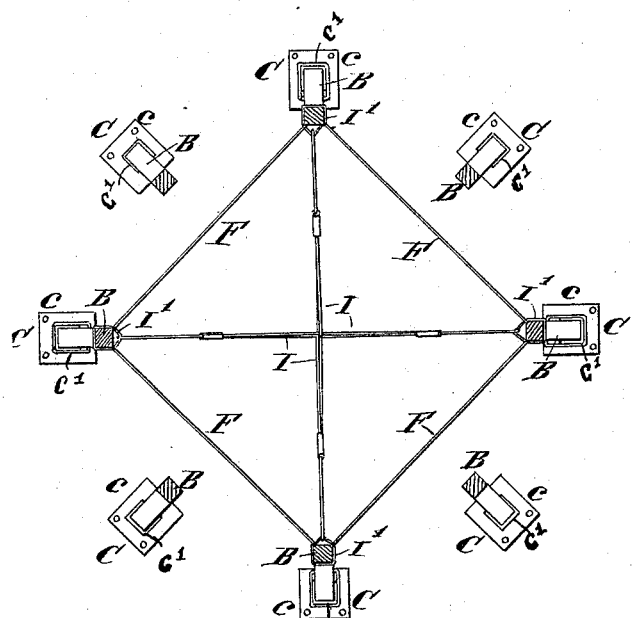
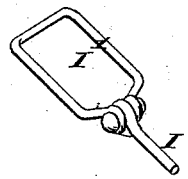
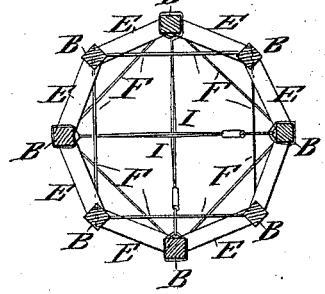
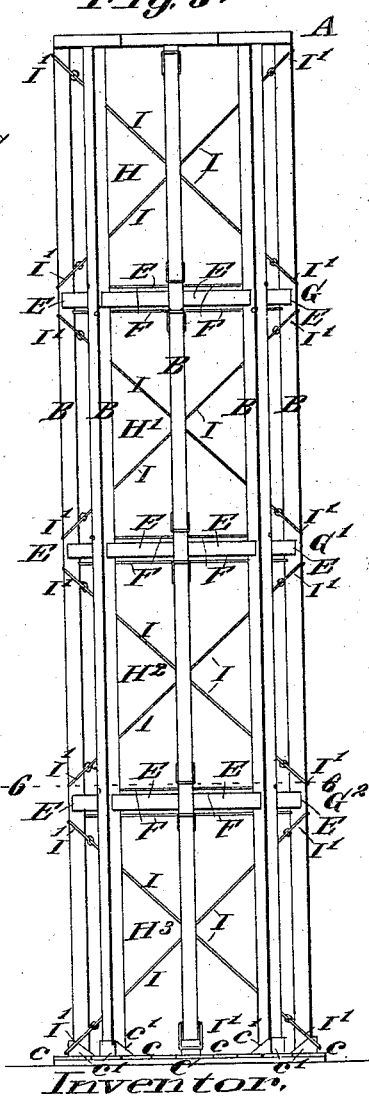
Attest:
W. H. Rothschild
J. W. Rothschild
Inventor:
Herbert W. Gleason,
by Rex Moody
his Attys (No Model.) 3 Sheets—Sheet 3.
H. W. GLEASON.
TOWER.
No. 540,096. Patented May 28, 1895.
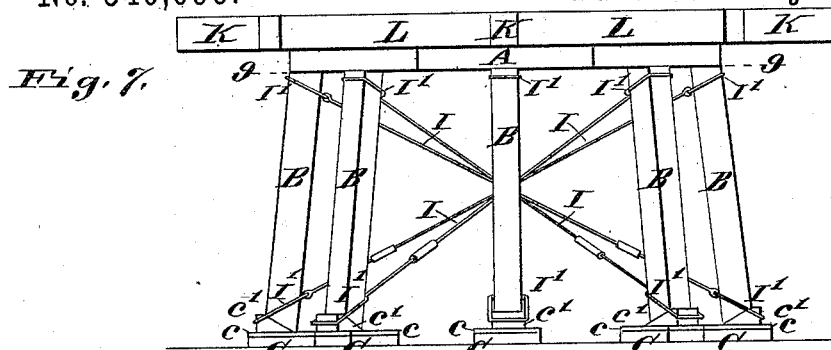
Fig. 7.
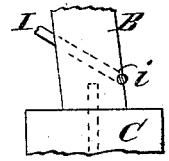
Fig. 12.
Fig. 8.
Fig. 10.
Fig. 11.
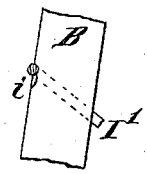
Fig. 9.
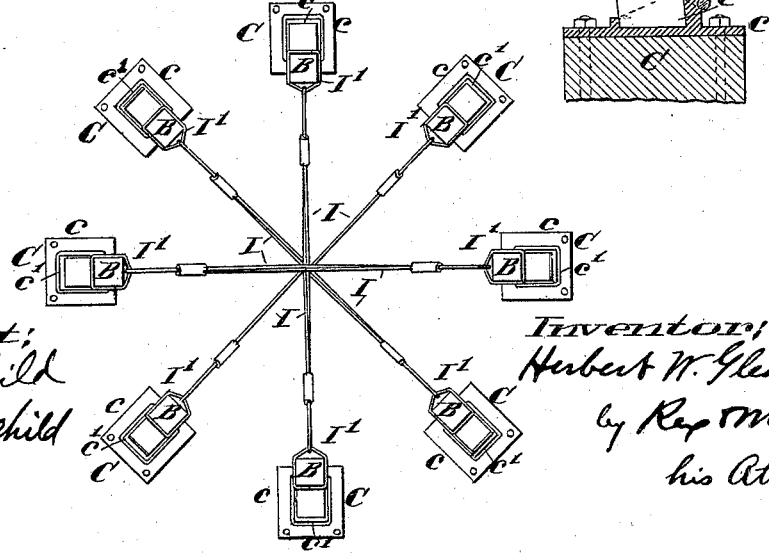
Attest:
W. H. Rothschild
J. W. Rothschild
Inventor:
Herbert W. Gleason
by Roy Moody
his Atty's

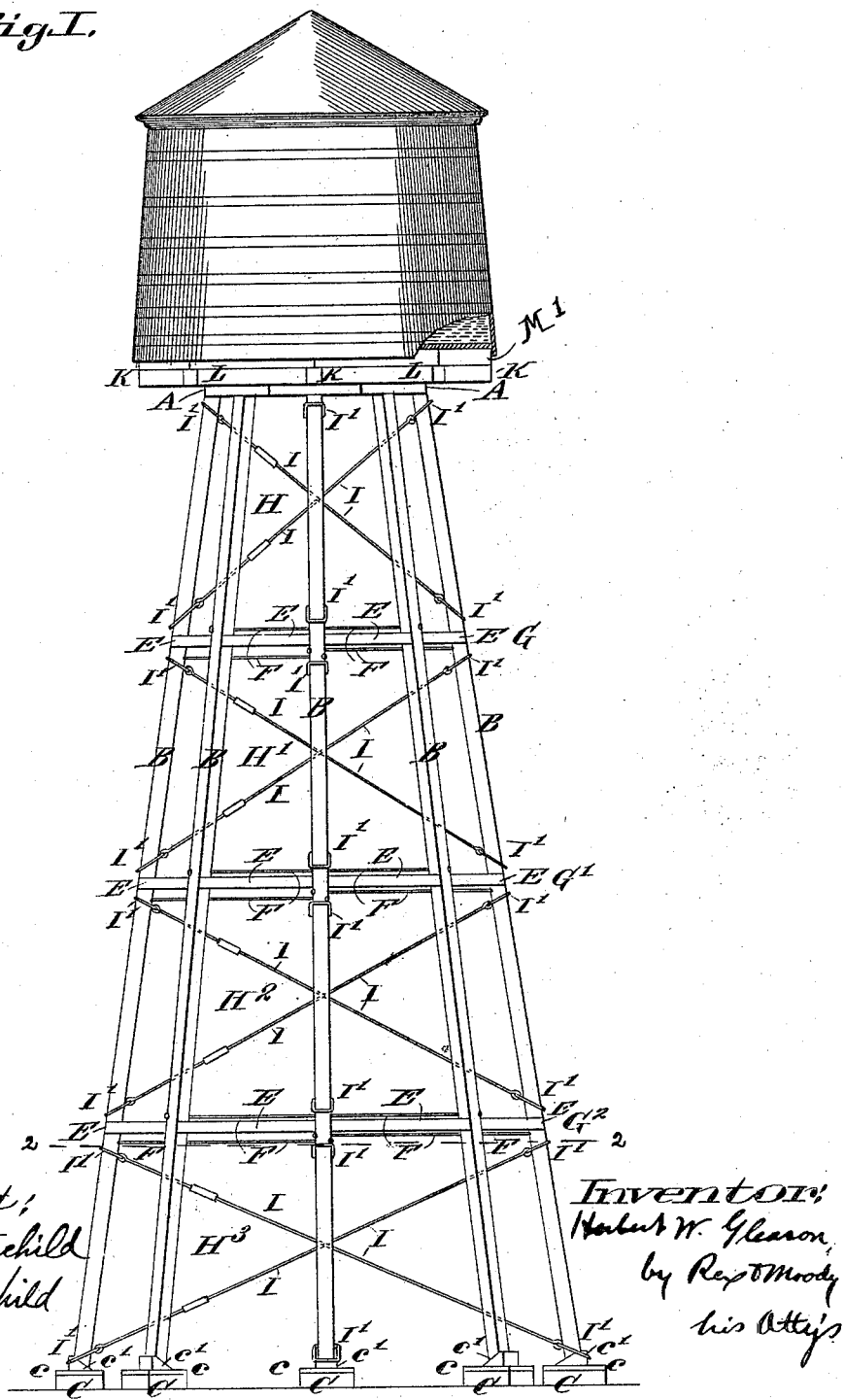

UNITED STATES PATENT OFFICE.

HERBERT W. GLEASON, OF ST. LOUIS, MISSOURI.

TOWER.

SPECIFICATION forming part of Letters Patent No. 540,096, dated May 28, 1895.

Application filed March 18, 1895. Serial No. 542,250. (No model.)

*To all whom it may concern:*

Be it known that I, HERBERT W. GLEASON, a citizen of the United States, residing at the city of St. Louis, in the State of Missouri, have invented a new and useful Improvement in Towers, of which the following is a specification.

My invention relates to improvements in towers whose tops are supported upon posts and especially such towers as are shown and described in Letters Patent of the United States No. 534,327, granted to me February 19, 1895, and the chief object of my improvement is to strengthen such towers by a system of diagonal ties. I attain that object by the structure illustrated in the accompanying drawings, in which—

Figure 1 is a view in perspective of a tower embodying my invention and a water-tank supported thereby. Fig. 2 is a horizontal cross-section of said tower along the line 2 2 of Fig. 1. Fig. 3 is a plan view of a collar by means of which the ties may be secured to the posts. Fig. 4 is a top view of the cap. Fig. 5 is a view in perspective of a modification of the form of tower represented in Fig. 1. Fig. 6 is a horizontal cross-section of the tower represented in Fig. 5 along the line 6 6. Fig. 7 is a view in perspective of a circular tower without horizontal ties or braces to which my system of diagonal ties has been applied. Fig. 8 is a top view of the cap and an arrangement of cross-beams thereon which I prefer to use. Fig. 9 is a horizontal cross-section along the line 9 9, Fig. 7. Fig. 10 is a detailed view showing a method of preventing vertical motion on the part of the collars used to connect the upper ends of the diagonal ties with the posts. Fig. 11 is a detailed view of the lower end of a post and its foundation, showing a method of securing the lower ends of the braces next the ground to the foundations and posts; and Fig. 12 is a similar view representing the lower end of a tie next the ground connected directly to a post and only secured to the foundation through the post with which it is connected.

Similar letters refer to similar parts throughout the several views.

A, (Figs. 1, 4, 5, 7, and 8) represents the cap of the tower. It is represented as octagonal in shape, but though that shape is preferred, it is not essential. It may be a polygon having any number of sides more than four, or may be formed in the shape of a circle or an ellipse.

B B B B B B B B, (Figs. 1, 2, 5, 6, 7, 9, 10, 11, and 12) are posts used to support the cap. They are preferably placed at equal distances apart, and where the cap is polygonal in shape and the posts equal in number to the sides of the cap, as I prefer they should be, each post preferably comes beneath the center of one of the sides of the cap as shown in Figs. 1, 5, and 7. The posts preferably incline outward from top to bottom as represented in Figs. 1 and 7, and preferably rest upon and are secured to foundations of concrete or masonry. Vertical posts may, however, be used to support the cap instead of the inclined posts, as shown in the construction represented in Fig. 5.

C C C C C C C C, (Figs. 1, 2, 5, 7, 9, 11, and 12) represent the foundations, and $c\ c\ c\ c\ c\ c\ c\ c$ represent plates bolted to the foundations, and each having a flange $c'$, forming a recess or socket for the reception of the lower ends of a post resting on the foundation, and each having at the rear a recess or hook $c^2$ to receive the collars by means of which, in the construction illustrated in Figs. 1, 5, and 7, the ties next the ground have their lower ends fastened to the foundations of the posts.

E E E E E E E E, (Figs. 1, 5, and 6) are braces placed between the posts.

F F F F F F F F, (Figs. 1, 2, 5, and 6) are tie-rods designed to hold the posts together and to assist in preventing spreading. They are equal in number to the posts. Two are connected to each post, one running from it to the second post from it on one side, and the other to the second post from it on the other side.

In very low towers the braces E and tie-rods F may be omitted as in the construction shown in Fig. 7. In such a construction the diagonal cross ties hereinafter referred to, are sufficient without other ties or braces.

In higher towers I use one or more sets of braces (E) and tie-rods (F) to strengthen the structure. In Figs. 1 and 5 the towers are provided with three sets of said ties and braces (F and E), lettered G, G', G², which divide the tower as represented into four sections, (H, H', H², H³.) I prefer to make each section about fifteen feet high though no special height is essential. The construction shown in Fig. 7 corresponds to section H³ in Figs. 1 and 5, the cap and superstructure taking the place of the braces E and the ties F.

Each section of the tower, whether it has one or more sections, is strengthened by diagonal ties I, I, &c., (Figs. 1, 2, 3, 5, 6, 7, and 9) secured to the posts by means of the collars I', I', &c., or any other suitable means known in the art; the method illustrated being one of many well-known ones, as will be obvious. The collars may be prevented from slipping vertically by outside horizontal grooves $i$, (Figs. 10 and 12) or any other suitable means. In each section of the tower I use at least two pairs of ties I. Each pair of diagonal ties unite a pair of opposite posts, one running from the top of one post of the pair to or near to the bottom of that portion of the other post of the pair within its section, and the other running diagonally from near the top of the second post of the pair to that portion of the first post near the bottom of the section, so as to form approximately the letter X, as represented quite clearly in Figs. 1, 2, 5, and 6. The other pair of ties is arranged in like manner so as to unite another pair of opposite posts, preferably a pair so located that the ties belonging to the latter pair will cross the ties of the first pair in planes substantially at right angles to those in which the first pair is located, as shown in Figs. 2 and 6. As will be observed, the diagonal cross ties are represented in the drawings as bent where they cross each other and hence are not straight from end to end though, as will be obvious, they may be otherwise arranged so as to remain straight. By reason of being bent neither of the ties runs in a single plane from end to end, strictly speaking, but it does so substantially, as the deviation from a straight course is but slight, and I wish such constructions as are shown to be understood as coming within my meaning where I speak of the plane or planes in which one pair of diagonal ties run crossing the plane or planes in which another pair run at approximately right angles. I intend by such language to include every case in which a horizontal line running between the centers of one pair of posts connected by the ties, would cross a similar line running between the centers of the other pair of posts at an approximately right angle. Where the braces E and ties F are used I prefer to only use two pairs of diagonal cross ties I, in any one section of the tower, for the reason that I consider a greater number unnecessary, but where an even number of posts are used, as many diagonal ties may be used as there are posts; one running from about the top of each post, or the portion of the post in its section, to the bottom, or near the bottom, of that portion of an opposite post in its section, as represented in Figs. 7 and 9. The only objections to the use of this arrangement of ties are that it increases both the weight and expense of the structure, though it adds something to its stability.

I prefer to fasten the lower ends of the lowermost set of diagonal ties to the foundations on which the posts rest, but instead of doing this they may be connected directly to the lower ends of the posts as shown in Fig. 12. Whichever course is pursued I prefer to attach the lower ends of the posts B securely to their foundations. This may be done either in the manner shown in Fig. 11 or in any other well-known manner.

K K, (Figs. 1, 7, and 8) are beams resting upon the cap A and connected with it by means of bolts $a$ $a$, or other suitable means. They cross each other at right angles and are mortised where they cross so as to leave their upper surfaces flush with each other. To their under sides I preferably attach a shoe M, (Fig. 8.) I prefer to so place these beams that each will rest upon the cap directly over posts, in the manner shown in Figs. 1 and 7, and preferably over posts which are connected together by diagonal ties I. They preferably extend some distance beyond the sides of the cap and I prefer that the cap piece should be of such a size as to make its sides come at about the center of gravity of that portion of the weight of the tank or other thing intended to be supported, lying between its center and circumference, supposing the center of gravity of the tank or other thing supported to be exactly over the center of the tower. In addition to the cross beams K K, I prefer to use four other beams L L L L, (Figs. 1, 7, and 8) whose inner ends rest upon the shoe M, to which they are attached, and whose outer ends are supported by the cap A, just as the other beams are. Upon the beams K and L joists M', (Fig. 1) may be arranged in any preferred manner.

I claim—

1. The combination in a tower, of a cap, four or more supporting posts, and two or more pairs of diagonal cross-ties, crossing substantially beneath the center of the tower, and each pair binding together a pair of oppositely arranged posts, substantially as described.

2. The combination of a cap and supporting posts circularly arranged and attached at their upper ends to the cap and at their lower ends connected with foundations, and two or more pairs of oppositely arranged posts, each pair connected by diagonal cross ties, one pair of diagonal cross ties running in substantially vertical planes which cross the planes in which another pair of said ties run at approximately a right angle, substantially as described.

3. The combination in a tower of a cap and supporting posts circularly arranged, and said tower being divided into two or more sections by one or more sets of braces E, and tie-rods F, the braces E being placed between the posts, and two tie-rods F running from each post, one to the second post on one side and the other to the second post on the other side, in the neighborhood of the braces, and each section of the tower being strengthened by at least two pairs of diagonal cross ties, each pair binding a pair of opposite posts together and so arranged that one set of diagonal cross ties run in planes approximately at right angles to the planes in which another set runs, substantially as described.

4. The combination in a tower of a cap and supporting posts circularly arranged, and said tower being divided into two or more sections by one or more sets of braces E and tie-rods F, the braces E being placed between the posts, and two tie-rods running from each post, one to the second post on one side and the other to the second post on the other side, in the neighborhood of the braces, and each section of the tower being strengthened by at least two pairs of diagonal cross ties, each pair binding opposite posts together, and one pair being so arranged as to run in a plane or planes approximately at right angles to the plane or planes in which another pair run, and the lower ends of the lowermost diagonal ties being fastened to the foundations, substantially as described.

5. The combination of a water tank and a supporting tower consisting essentially of a cap and a series of supporting posts, circularly arranged, and two or more pairs of diagonal cross ties, each pair binding together a pair of opposite posts, and the upper ends of the posts being placed substantially beneath what would be the line of division, if the tank were full, and its contents were divided into an inner and outer portion of equal weight by a line parallel with the outside of the tank, substantially as described.

6. The combination of the cap A, the beams K K, crossing each other at right angles and resting on and attached to the cap, and four supporting posts arranged beneath and attached to the cap with their respective upper ends beneath the four points where said beams cross said cap, and said posts being bound together by two pairs of diagonal cross ties, each pair of ties binding a pair of opposite posts together, substantially as described.

H. W. GLEASON.

Witnesses:
 MARK MOODY,
 BENJ. F. REX.